(No Model.) 2 Sheets—Sheet 1.
G. E. WHEELER.
EVAPORATOR.
No. 417,848. Patented Dec. 24, 1889.
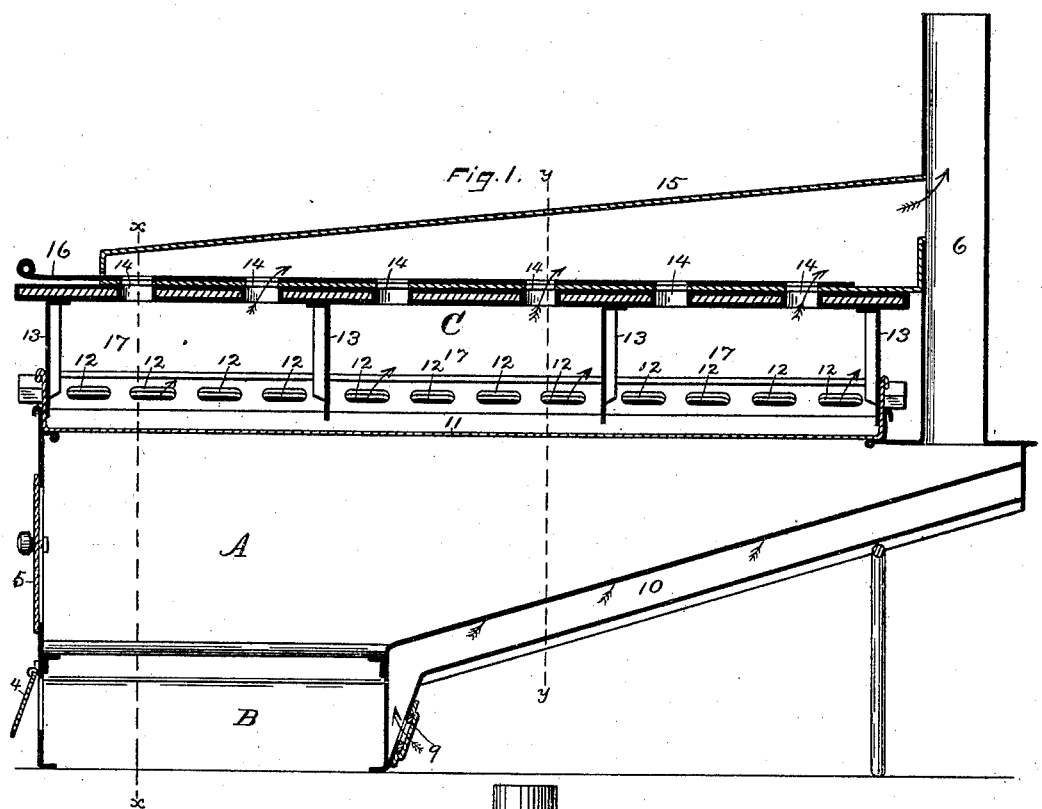
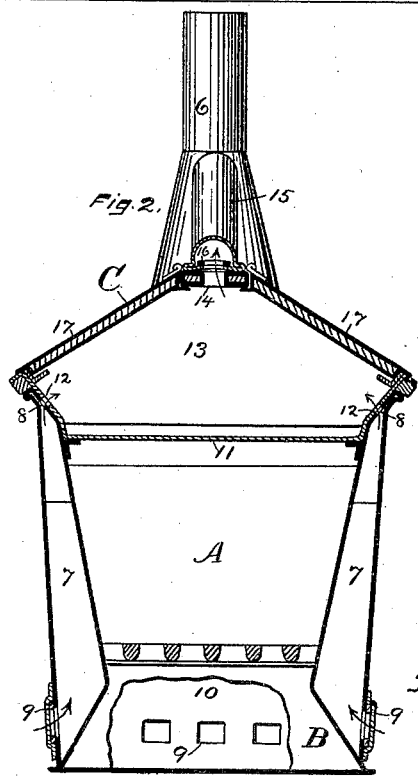
Witnesses.
John Edwards Jr.
F. H. Buell
Inventor.
George E. Wheeler.
By James Shepard
Atty.

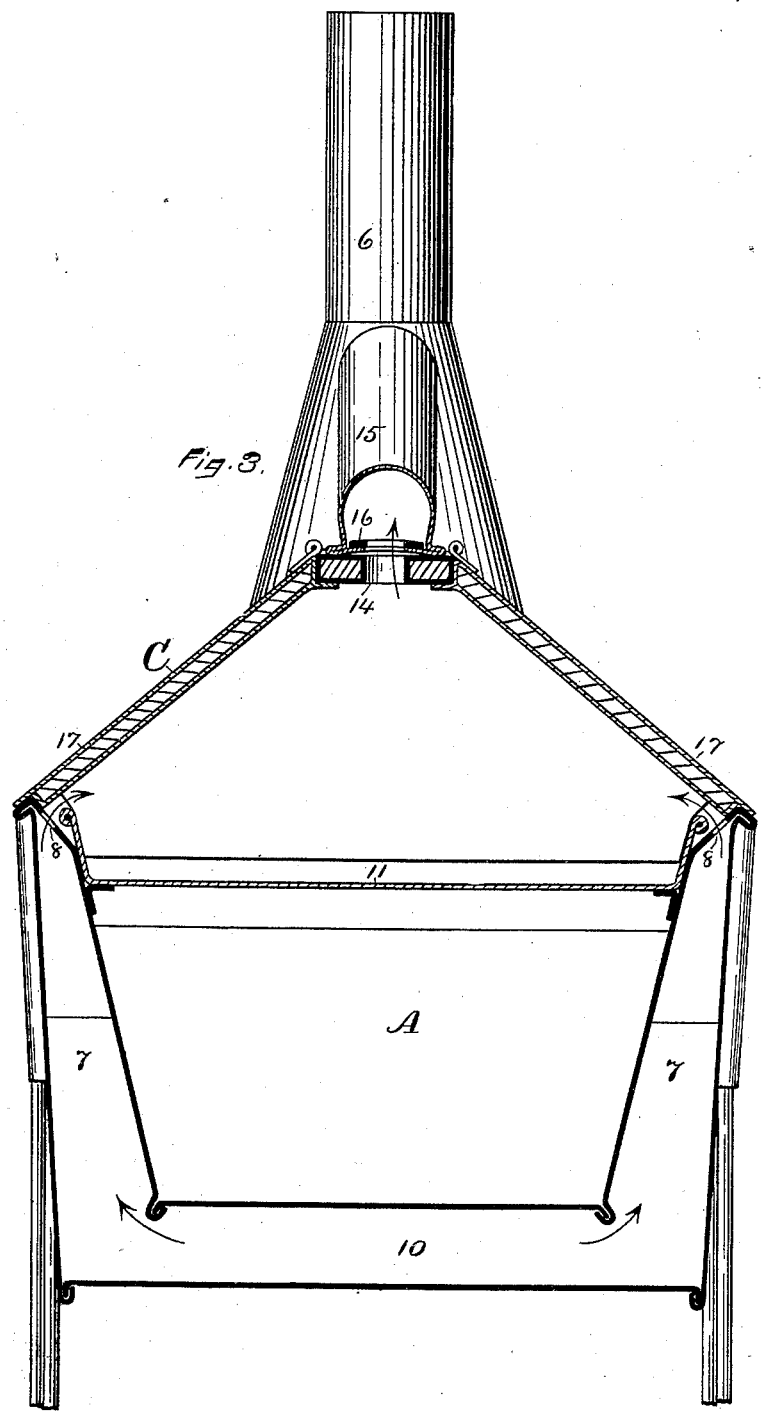

UNITED STATES PATENT OFFICE.

GEORGE E. WHEELER, OF CHAZY, NEW YORK.

EVAPORATOR.

SPECIFICATION forming part of Letters Patent No. 417,848, dated December 24, 1889.

Application filed January 7, 1889. Renewed November 22, 1889. Serial No. 331,181. (No model.)

*To all whom it may concern:*

Be it known that I, GEORGE E. WHEELER, a citizen of the United States, residing at Chazy, in the county of Clinton and State of New York, have invented certain new and useful Improvements in Evaporators, of which the following is a specification.

My invention relates to improvements in evaporators of the class in which the liquid is evaporated from within a pan; and the objects of my improvement are economy and durability of construction, economy in fuel and time, and, in general, to increase the efficiency of the process and improve the product.

In the accompanying drawings, Figure 1 is a longitudinal section of my evaporator. Fig. 2 is a transverse section thereof on line $x$ $x$ of Fig. 1, with part of the rear wall of the ash-space broken away; and Fig. 3 is a transverse section thereof on line $y$ $y$ of Fig. 1, on an enlarged scale, and showing also a slight modification in the arrangement of the pan and cover.

I intend to construct my evaporator mainly of sheet-iron; but it may be constructed of other material either in whole or in part.

A designates the fire-box or heating-chamber, having a grated bottom at its front end with an ash-space B underneath.

4 is a damper for regulating the draft to the fire-box or heating-chamber, and 5 is the door for furnishing access to the heating-chamber for the introduction of fuel or other purpose, and 6 designates the smoke-stack, which leads from the heating-chamber. Upon each side of the heating-chamber I provide air-chambers 7 7, which extend from at or near the bottom of the evaporator to the top of the heating-chamber, and the upper wall of these air-chambers upon both sides are perforated, as at 8, Figs. 2 and 3. At the lower part of these air-chambers I provide dampers 9 for the admission of air into said chambers and for regulating the admission thereof. On the bottom of the fire-chamber in that part which slants upwardly in the rear of the ash-space I also form an air-chamber 10, which is also provided with a damper 9, and this bottom air-space opens into the side air-chambers 7 7, as shown in Fig. 3.

11 designates the evaporating-pan, which fits over the top of the fire-chamber A and covers said fire-chamber, the side flanges of the pan resting upon or over the upper ends of the air-chambers upon both sides of the heater. This pan in the preferred form is provided with a series of openings 12, which register with and form a continuation of the openings 8 at the upper wall of the air-chambers 7, whereby the air flowing from said chambers enters the inside of the pan. The pan may be of any ordinary construction in its general features, and I have shown it as provided with a cover C, having diaphragms or partitions 13, which divide the pan into compartments in accordance with the cover patented to me November 20, 1888, No. 393,196, and for which other covers may be substituted, although this cover is preferred. Whatever cover is employed should, in order to reach the best results, have its inside surface insulated from external air—as, for instance, by covering with paper or asbestus. The top of the cover is provided with a series of discharge-apertures 14, which, as shown, open into a horizontal conductor 15, that opens into the smoke-stack 6.

16 designates a damper for adjusting the openings leading from the cover to the horizontal conductor. While I prefer to employ the horizontal conductor leading to the smoke-stack, it is evident that the cover may be provided with independent draft tubes or chimneys, as shown in my aforesaid patent.

In Fig. 3 the side edges of the pan 11 are imperforate and its upper edge does not cover the openings 8 of the air-chamber 7, and the doors 17 of the cover may shut upon the upper edge of the sides in which the air-chambers 7 7 are formed, as shown in Fig. 3, whereby the air flowing from said chambers passes around and over the upper edge of the pan to the evaporating-chamber formed by the pan and cover, instead of passing through the openings in the sides of the pan, as in the construction first described. The pan being supplied with fluid and the heating-chamber with heat, which will be imparted to the fluid and air chambers, and as soon as the air in the chambers and evaporator expands, and in time with the added expansion of steam, air and steam will flow out through the openings 14 into the conductor 15 and pass out through the smoke-stack 6. A fresh supply of air is furnished through the dampers 9, which immediately becomes heated within the air-chambers, passes through said chambers by the orifices 8 into the evaporating-chamber, and thereby feeds and supplies the natural draft through the conductor to the smoke-stack. Inasmuch as this air is admitted to the pan or evaporating-chamber in a heated condition, all condensation of steam is avoided and the evaporation is very rapid. At the same time this passage of air through the pan does not have a tendency to withdraw the heat from the pan, but the reverse. The air-chambers by the continual passage of air through them have a tendency to preserve the apparatus and make it more durable. Furthermore, the heat that would be otherwise lost by radiation is utilized by passing it through the evaporating-chamber.

I am aware that prior patents show pans for containing liquid, heating-chambers, air-chambers, and covers in combination with devices for minutely dividing the liquid within an inclosed space above the pan, so that it is evaporated by direct contact with hot air within said space and not when within the pan, and the same are hereby disclaimed.

I claim as my invention—

1. The combination of the heating-chamber A, the air-chambers 7 7 upon the sides of said heating-chamber, perforated at their upper ends, the pan 11, within which the liquid is evaporated by the heat from said chamber, and the cover C, having its inside surface insulated from external air by an outer protection—as, for instance, a covering of paper or asbestus—substantially as described, and for the purpose specified.

2. The combination of the heating device, consisting of the heating-chamber and air-chambers provided with inlets 9 and discharge-orifices 8, the pan 11 and its cover forming a series of evaporating-chambers, into which the air-chambers open, the cover also being provided with a series of discharge-orifices 14, the conductor 15, into which said discharge-orifices open, and the smoke-stack 6, substantially as described, and for the purpose specified.

3. In an evaporator, the heating device consisting of the air-chambers 7 7, forming the sides of the heater, the ash-space B under the grating at one end, and the bottom at the rear of said ash-space provided with the bottom air-chamber 10, which opens into the side air-chambers, in combination with an evaporating-pan located over the heater and means for conveying the heated air over the pan, substantially as described, and for the purpose specified.

GEORGE E. WHEELER.

Witnesses:
JAMES SHEPARD,
JOHN EDWARDS, Jr.